United States Patent [19]

Mack

[11] Patent Number: 5,529,548
[45] Date of Patent: Jun. 25, 1996

[54] VEHICLE LAUNCH ENGINE FUEL CONTROL

[75] Inventor: William J. Mack, Clemmons, N.C.

[73] Assignee: Eaton Corporation, Cleveland, Ohio

[21] Appl. No.: 370,050

[22] Filed: Jan. 9, 1995

[51] Int. Cl.$^6$ .................... B60K 41/02; F16D 48/08
[52] U.S. Cl. .................... 477/84; 477/110; 123/492; 364/431.07
[58] Field of Search .................... 477/73, 74, 83, 477/84, 107, 110, 111; 364/431.07; 123/492

[56] References Cited

U.S. PATENT DOCUMENTS

| | | | |
|---|---|---|---|
| 4,081,065 | 3/1978 | Smyth et al. | 192/76 |
| 4,361,060 | 11/1982 | Smyth | 74/866 |
| 4,638,898 | 1/1987 | Braun | 192/52 |
| 4,646,891 | 3/1987 | Braun | 192/32 |
| 4,714,144 | 12/1987 | Speranza | 192/84 |
| 4,873,637 | 10/1989 | Braun | 364/424.1 |
| 4,874,070 | 10/1989 | Nellums et al. | 192/52 |
| 4,922,425 | 5/1990 | Mack et al. | 364/424.1 |
| 5,316,116 | 5/1994 | Slicker et al. | 477/181 |

Primary Examiner—Charles A. Marmor
Assistant Examiner—Nathan O. Jensen
Attorney, Agent, or Firm—Howard D. Gordon

[57] ABSTRACT

A control method/system for controlling engine fueling during vehicle launch conditions for a vehicle equipped with an automated mechanical transmission system (10) including a fuel-controlled engine (14), a master friction clutch (16), a multiple-speed mechanical transmission (12) and a microprocessor-based control unit (44). During vehicle launch, if throttle position (THL) is less than a reference value (10–20% of maximum fueling), fueling is according to throttle position; otherwise, fueling is a calculated amount ($F_{CALC}$) determined by the control unit as a function of throttle position, engine speed (ES) and/or the rate of change (dES/dt) thereof, clutch condition and/or time factors.

10 Claims, 4 Drawing Sheets

VEHICLE LAUNCH ENGINE FUEL CONTROL

BACKGROUND OF THE INVENTION

1. Field of the Invention

The present invention relates to control systems/methods for controlling the fueling of a fuel-controlled engine associated with an automated mechanical transmission system including an automated master friction clutch interposed between the engine and a transmission input shaft during vehicle launch operations.

2. Description of the Prior Art

Fully and partially automated mechanical transmission systems are well known in the prior art. See, for example, U.S. Pat. Nos. 4,361,060; 4,860,861; 4,648,290; 5,050,451; 5,272,939; 5,316,116 and 5,337,868, the disclosures of which are incorporated herein by reference. Such systems typically include a fuel-controlled engine, a fuel controller, a multiple-speed mechanical (i.e., jaw clutch-type) transmission, a transmission controller, a master friction clutch drivingly interposed between the engine and transmission and a microprocessor-based control unit (see U.S. Pat. No. 4,595,986, the disclosure of which is incorporated herein by reference) for receiving input signals and processing same according to logic rules to issue command output signals to system actuators.

It also is known to provide automated mechanical transmission systems with automatic clutch actuators and logic rules to control master clutch engagement during vehicle launch (also called "start-from-stop") operations. Examples of such vehicle launch controls may be seen by reference to U.S. Pat. Nos. 4,081,065; 4,638,898; 4,646,891; 4,714,144; 4,873,637; 4,874,070 and 5,316,116, the disclosures of which are incorporated herein by reference.

During engagement of the master clutch to launch a vehicle, it was known to control both the clutch actuator and the fuel actuator as functions of throttle position, engine speed, rate of change of engine speed and/or degree of clutch engagement to achieve a smooth, rapid clutch engagement while avoiding stalling and racing of the engine. To achieve this, the engine often was caused to be fueled in a gradually ramped-up manner to achieve an engine speed or engine flywheel torque determined by the control unit, regardless of the displacement of the throttle pedal. While these controls provide very acceptable vehicle launches under most conditions, the controls were not totally satisfactory, as response was somewhat sluggish, particularly when the vehicle was operating in a slow-speed creep or maneuvering mode or rapid acceleration of the vehicle is desired.

SUMMARY OF THE INVENTION

In accordance with the present invention, the drawbacks of the prior art are overcome or minimized by a vehicle launch control wherein, when the operator is requesting fueling of the engine, the engine response is relatively instantaneous. This is achieved by determining a torque limit which would be non-abusive to the driveline under most conditions and which would be sufficient to satisfy the driver. By way of example, the torque limit ($REF_T$) preferably is about the torque associated with a 10–20% displacement of the throttle pedal.

According to the present invention, during vehicle launch, if the operator requests, by displacing the throttle pedal, engine fueling to achieve a torque less than the torque limit ($T_{REQ} \leq REF$), then the engine is fueled accordingly, and if the requested engine torque exceeds the torque limit ($T_{REQ} > REF$), the engine is fueled in accordance with the amount determined ($F_{CALC}$) by the vehicle start-from-stop logic.

Accordingly, it is an object of this invention to provide an automated mechanical transmission system vehicle launch control which, is more responsive than the prior art controls, particularly when either low-speed creep or rapid acceleration of the vehicle is desired.

This and other objects and advantages of the present invention will become apparent from a reading of the description of the preferred embodiment taken in connection with the drawings.

DESCRIPTION OF THE PREFERRED EMBODIMENT

Figure 1:
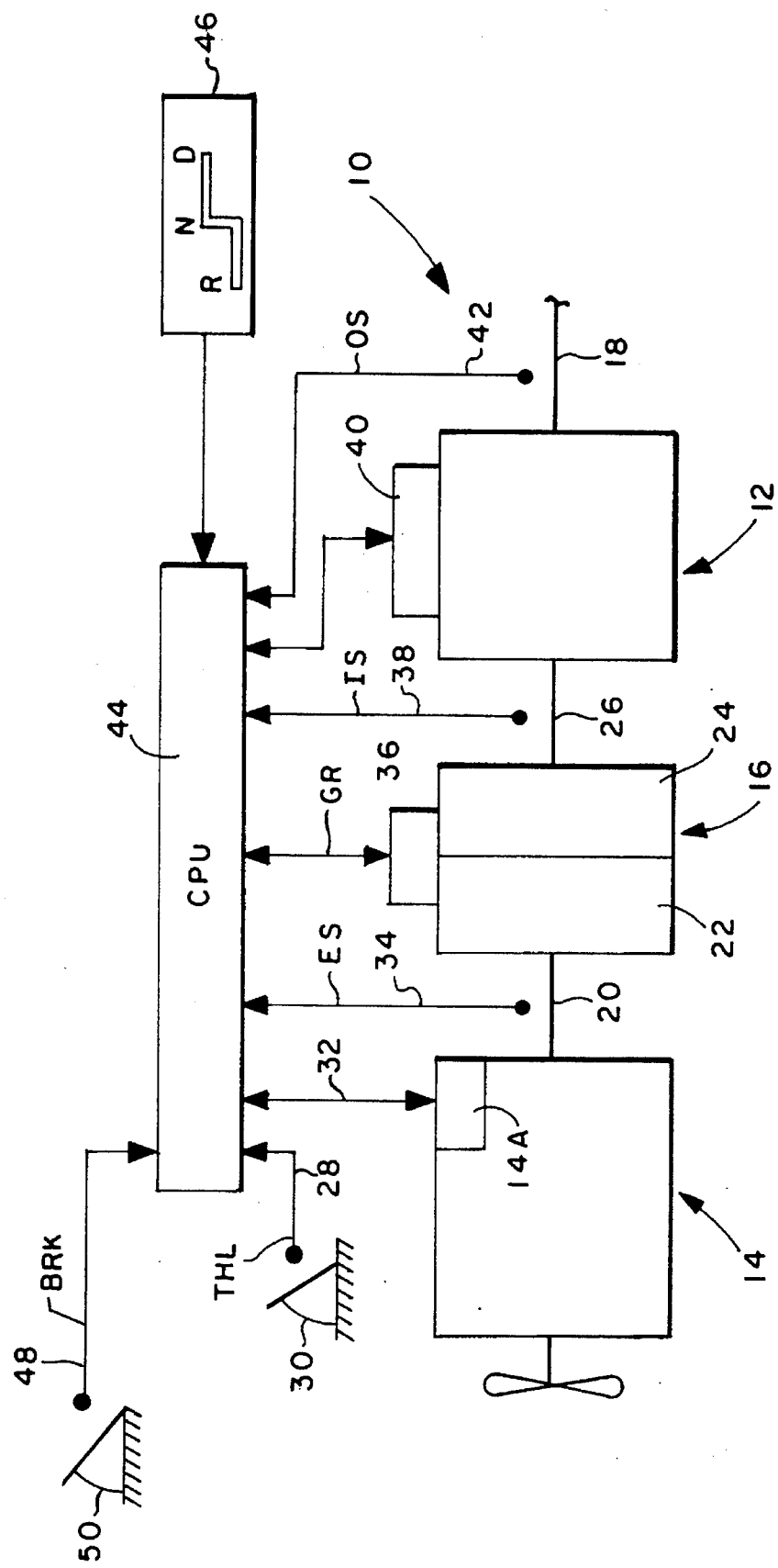
FIG. 1 is a schematic illustration of an automated mechanical transmission system advantageously utilizing the control of the present invention.

For convenience and reference only, certain terminology will be used in the following description and will not be limiting. The words "upwardly," "downwardly," "rightwardly" and "leftwardly" will designate directions in the drawings to which reference is made. The words "inwardly" and "outwardly" refer to directions toward and away from, respectively, the geometric center of the device and designated parts thereof. Said definitions apply to the words specifically mentioned above, derivatives thereof and words of similar import.

The present invention relates to an improved control system/method for vehicle launch operations in vehicles equipped with an at least partially automated mechanical transmission systems wherein master clutch operation is automated for both vehicle launch and dynamic shifting operations. With the vehicle at rest, as may be sensed by transmission output shah speed substantially equaling zero, a vehicle launch or start-from-stop operation is initiated by the driver displacing the throttle pedal from its non-displaced position. A vehicle launch operation is considered to terminate upon either application of the vehicle brakes or the first dynamic shift of the transmission.

FIG. 1 schematically illustrates a vehicular automated mechanical transmission system 10 including an automated multiple-speed change-gear transmission 12 driven by a fuel-controlled engine 14, such as a well-known diesel engine, through a non-positive coupling such as a master friction clutch 16. The output of the automated transmission 12 is output shaft 18, which is adapted for driving connection to an appropriate vehicle component, such as the differential of a drive axle, a transfer case or the like, as is well known in the prior art. The automated mechanical transmission 10 may be of the clash type, synchronized type and/or blocked type and may be a simple or a compound transmission. Transmissions of this type may be seen by reference to U.S. Pat. Nos. 3,105,395; 4,754,665 and 4,736, 643, the disclosures of which are incorporated herein by reference.

The crankshaft 20 of engine 14 will drive the driving plates 22 of master friction clutch 16, which are frictionally engageable to driven plates 24 for driving the input shaft 26 of transmission 12.

The aforementioned drivetrain components are acted upon and/or monitored by several devices, each of which will be briefly discussed below. These devices include a throttle pedal position or throttle opening monitor assembly 28 which senses the operator-set position of the operator-controlled throttling device 30, a fuel control device 14A for controlling by means of a data link the amount of fuel to be supplied to engine 14, an engine speed sensor 34 for sensing the rotational speed of the engine, a clutch operator 36 which engages and disengages master clutch 16 and which also may provide information as to the status of the clutch, an input shaft speed sensor 38 for sensing the rotational speed of transmission input shaft 26, a transmission operator 40 which is effective to shift transmission 12 into a selected gear ratio and to provide a signal indicative of the gear neutral condition and/or the currently engaged gear ratio, and an output shaft speed sensor 42 for sensing the rotational speed of output shaft 18.

The aforementioned devices supply information to and/or accept command signals from the central processing unit or control 44. The central processing unit 44 may include analog and/or digital electronic calculation and logic circuitry, as is well known in the prior art. The central processing unit also will receive information from a shift control assembly 46 by which the vehicle operator may select a reverse (R), neutral (N) or forward drive (D) mode of operation of the vehicle. A brake pedal sensor 48 also may be provided to provide an input signal (BRK) indicative of operation of the vehicle brakes 50.

An electrical power source (not shown) and/or a source of pressurized fluid (not shown) provides electrical, hydraulic and/or pneumatic power to the various sensing, operating and/or processing units. Drivetrain components and controls therefor of the type described above are known in the prior art and may be appreciated in greater detail by reference to U.S. Pat. Nos. 4,595,986; 4,576,065 and 4,445,939, the disclosures of which are incorporated herein by reference. The sensors 28, 34, 36, 38, 42 and 46 may be of any known type of construction for generating analog or digital signals proportional to and/or indicative of the parameter monitored thereby. Similarly, operators 14A, 36 and 40 may be of any known electric, hydraulic and/or pneumatic type, or a combination thereof, for executing operations in response to command output signals from the central processing unit 44.

In addition to direct inputs, the central processing unit 44 may be provided with circuitry for differentiating selected input signals. Further, communication between the vehicle engine 14, the throttle position monitor 30 and the central processing unit 44 may be by means of an electronic datalink, preferably conforming to a protocol similar to SAE J1922 and/or SAE J1939.

Figure 1A:
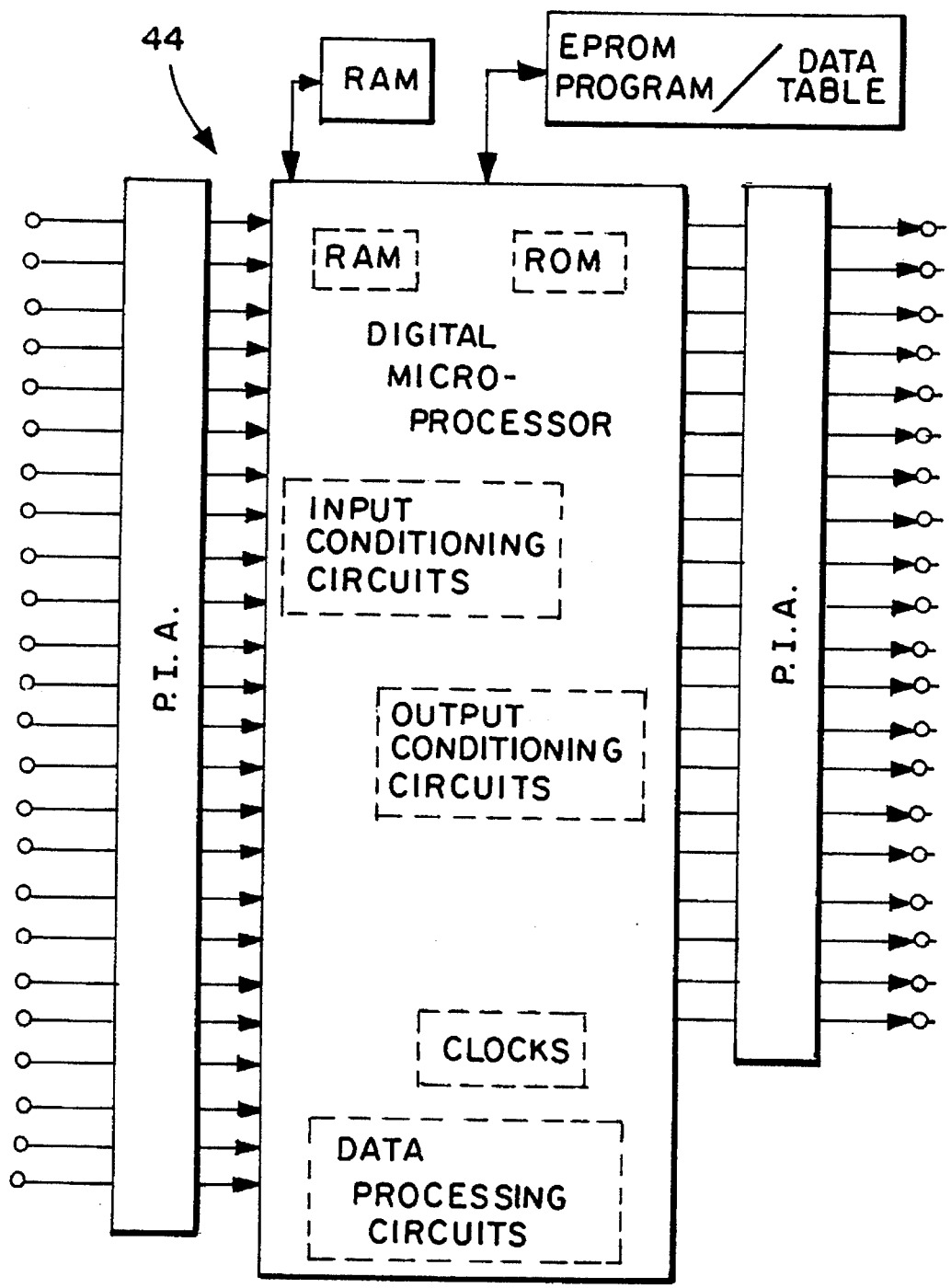
FIG. 1A is a schematic illustration of a microprocessor-based control unit.

As is known and as is taught in aforementioned U.S. Pat. Nos. 4,873,637; 4,874,070 and 5,316,116, during a vehicle launch operation, the central processing unit will control the rate and extent of engagement of the vehicle master clutch and the amount of fuel supplied to the engine in accordance with predetermined logic rules and as functions of certain control parameters, such as the operator's position of the throttle pedal, engine speed, rate of change of engine speed, clutch position and/or the passage of time, FIG. 1A schematically illustrates a typical microprocessor-based control unit, such as CPU 44, having input signal receiving means, processing means and output signal generating means.

Figure 2:
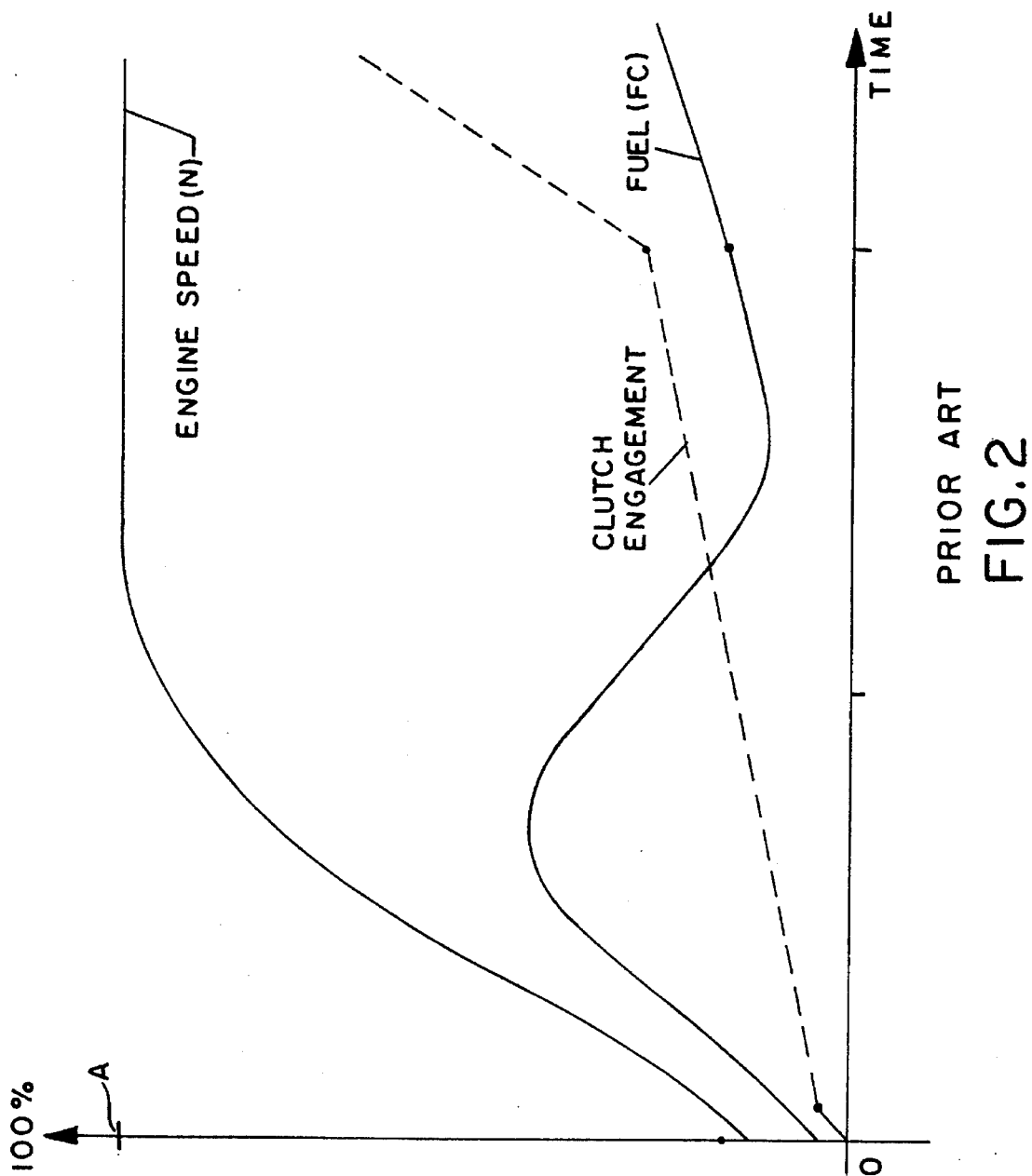
FIG. 2 is a graphical representation of a prior art vehicle launch operation.

FIG. 2 illustrates a vehicle start-from-stop or vehicle launch clutch engagement operation according to a prior art control method. As may be seen, engine speed is caused to equal a set value, usually a value associated with the operator's displacement of the throttle pedal, and fueling and clutch engagement then are modulated to maintain the engine speed at substantially this set value while increasingly engaging the clutch. Fueling of the engine is modulated during this operation to achieve these results. The line labeled "Fuel (FC)" is the calculated amount of fuel provided to the engine according to the control logic for the start-from-stop operation of FIG. 2 and is determined by the central processing unit and not directly by the operator's displacement of the throttle pedal. The vehicle launch operation illustrated in FIG. 2 is simply representative and many modified and/or alternative vehicle launch logics are known.

As previously indicated, controlling the master clutch and the fueling of the engine in a manner to achieve a smooth and relatively rapid clutch engagement as illustrated in FIG. 2 is highly satisfactory for most vehicle launch situations for vehicles equipped with automated mechanical transmission systems of the type illustrated in FIG. 1. However, due to the fact that the amount of fuel supplied to the engine is not controlled directly by the operator's positioning of the throttle pedal and that increases in fueling generally are accomplished in a ramped-type manner, the prior art controls were not as responsive as desired when the vehicle was operating at a relatively slow speed during creeping and maneuvering-type operations or when the operator desires rapid acceleration of the vehicle.

Figure 3:
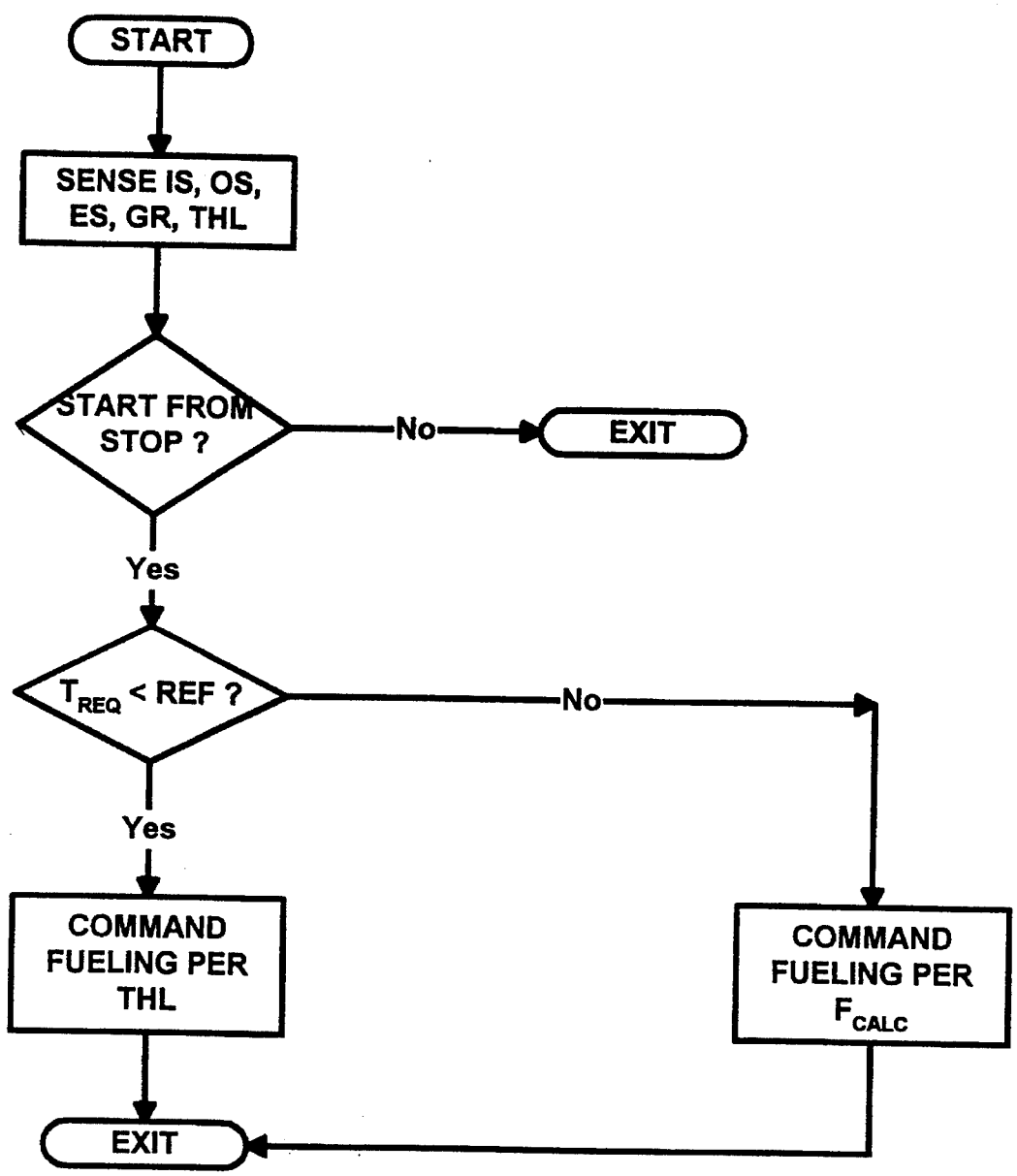
FIG. 3 is a schematic illustration, in flow chart format, of the control of the present invention.

To provide a more acceptable and more responsive control system/method, Applicant has provided the control system/method of the present invention, as is schematically illustrated in flow chart format in FIG. 3.

In accordance with the control of the present invention, a torque limit (REF) is determined which will not be abusive to the vehicle driveline under most conditions and which will be sufficient to satisfy the driver during most vehicle operations. By way of example, the torque limit (REF) preferably is about the torque associated with a 10–20% displacement of the throttle pedal. When the operator desires quick response from the engine, he rapidly depresses the throttle pedal beyond 20%. The control allows engine torque to rapidly produce torque associated with the 10–20% throttle displacement instead of beginning its ramp at zero and causing a lag in the engine response.

It is noted that the throttle pedal has a non-displaced position (0% displacement) corresponding to a minimum amount of fueling to maintain a smooth idling of the engine and may be displaced up to a 100%-displaced position wherein the operator is requesting maximum fueling of the engine. It is also noted that for a given amount of fueling of the engine, the engine will develop a given amount of flywheel torque. In this application, a request for a particular amount of fueling is equivalent to a request for a particular amount of engine flywheel torque.

According to the control method/system of the present invention, during vehicle launch operations, if the amount of engine flywheel torque (engine fueling) requested by the operator's displacement of the throttle pedal is less than or equal to the torque limit (REF), then the engine will be fueled in accordance with the operator-set throttle position.

If the amount of engine flywheel torque (engine fueling) requested by the operator's displacement of the throttle pedal exceeds the torque limit, the engine will be fueled in accordance with a calculated amount of fuel ($F_{CALC}$), as determined by the standard start-from-stop logic routines. It has been found that a relatively small displacement of the throttle pedal is an indication that the vehicle operator intends to operate in a low-speed creeping/maneuvering-type manner while a greater displacement of the throttle indicates the vehicle operator's intent to operate at other than a low-speed manner.

Accordingly, it may be seen that the present invention provides a vehicle launch control for a vehicle equipped with an automated mechanical transmission system having improved responsiveness for both low-speed maneuvering operation and intentional rapid acceleration of the vehicle.

Although the present invention has been set forth with a certain degree of particularity, it is understood that various modifications are possible without departing from the spirit and scope of the invention as hereinafter claimed.

I claim:

1. A control method for controlling engine fueling during vehicle launch operations of a vehicle equipped with an automated mechanical transmission system comprising a fuel-controlled engine (14), a fuel controller (14A) for controlling fueling of the engine, a multiple-speed mechanical transmission (12), a master friction clutch (16) drivingly interposed between the transmission and the engine, a non-manually controlled clutch actuator (36) for controlling engagement and disengagement of the master clutch, a manually positioned throttle (30), a throttle position sensor for providing input signals (THL) indicative of throttle position, and a control unit (44) for receiving input signals including said input signal indicative of throttle position and for processing same in accordance with predetermined logic rules to issue command output signals to system actuators including said fuel controller and said clutch actuator, said logic rules including rules for sensing operation in a vehicle launch operation including controlling engagement of said master clutch and controlling fueling of said engine to a calculated fueling value ($F_{CALC}$), regardless of the fueling level ($T_{REQ}$) corresponding to throttle position (THL), said method comprising the steps of:

(1) determining a reference level of engine flywheel torque (REF) deemed to be non-damaging to the vehicle driveline and satisfactory to the vehicle operator for low-speed operations;

(2) sensing for vehicle launch conditions; and (3) during vehicle launch conditions, if the fueling level requested by throttle position is less than the reference level, causing fueling of the engine to be as requested by throttle position, and if the fueling level requested by throttle position exceeds the reference level, causing fueling of the engine to be the calculated fueling value.

2. The method of claim 1 wherein said reference level corresponds to the fueling requested at 20% or less of full throttle displacement.

3. The method of claim 2 wherein said reference level corresponds to the fueling requested at about 10% of full throttle displacement.

4. The method of claim 2 wherein said input signals include a signal indicative of transmission engaged ratio (GR) and operation of the vehicle brakes and said sensing of vehicle launch conditions includes sensing termination of vehicle launch conditions upon sensing either one of (i) initiation of a transmission ratio change or (ii) application of the vehicle brakes.

5. The method of claim 2 wherein said calculated fueling value is less than or equal to the fueling of the engine as requested by the throttle position.

6. A machine for controlling engine fueling during vehicle launch operations of a vehicle equipped with an automated mechanical transmission system comprising a fuel-controlled engine (14), a fuel controller (14A) for controlling fueling of the engine, a multiple-speed mechanical transmission (12), a master friction clutch (16) drivingly interposed between the transmission and the engine, a non-manually controlled clutch actuator (36) for controlling engagement and disengagement of the master clutch, a manually positioned throttle (30) and a throttle position sensor for providing input signals (THL) indicative of throttle position, said machine comprising:

input signal receiving means for receiving input signals including input signals indicative of throttle position;

data processing means (44) for processing said input signals according to predetermined logic rules to issue command output signals to system actuators including said fuel controller and said clutch actuator, said logic rules including rules for:

(1) sensing operation in a vehicle launch operation including controlling engagement of said master clutch and controlling fueling of said engine to a calculated fueling value ($F_{CALC}$), regardless of the fueling level ($T_{REQ}$) corresponding to throttle position (THL);

(2) determining a reference level of engine flywheel torque (REF) deemed to be non-damaging to the vehicle driveline and satisfactory to the vehicle operator for low-speed operations; and (3) during vehicle launch conditions, if the fueling level requested by throttle position is less than the reference level, causing fueling of the engine to be as requested by throttle position, and if the fueling level requested by throttle position exceeds the reference level, causing fueling of the engine to be the calculated fueling value; and output signal generating means for issuing said command signals to said actuators.

7. The machine of claim 6 wherein said reference level corresponds to the fueling requested at 20% or less of full throttle displacement.

8. The machine of claim 7 wherein said reference level corresponds to the fueling requested at about 10% of full throttle displacement.

9. The machine of claim 7 wherein said input signals include a signal indicative of transmission engaged ratio (GR) and operation of the vehicle brakes and said sensing of vehicle launch conditions includes sensing termination of vehicle launch conditions upon sensing either one of (i) initiation of a transmission ratio change or (ii) application of the vehicle brakes.

10. The machine of claim 7 wherein said calculated fueling value is less than or equal to the fueling of the engine as requested by the throttle position.

* * * * *